No. 896,901. PATENTED AUG. 25, 1908.
H. DUBROW & J. YURKOVICH.
NUT LOCK.
APPLICATION FILED FEB. 13, 1908.
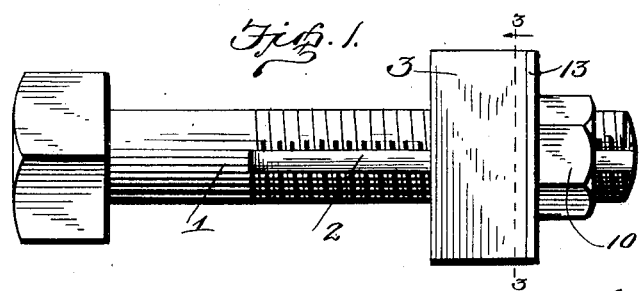
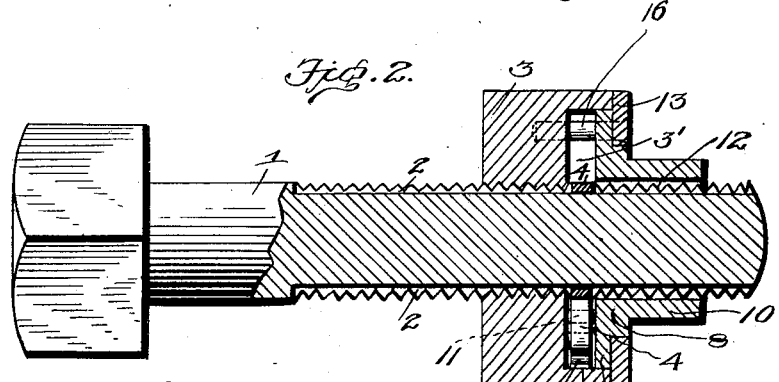
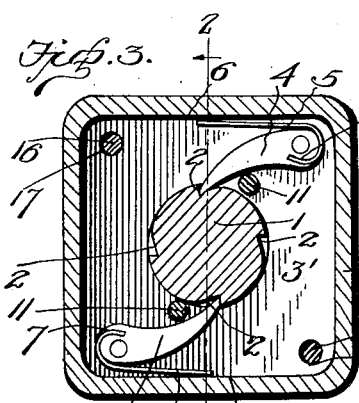
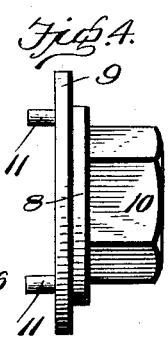
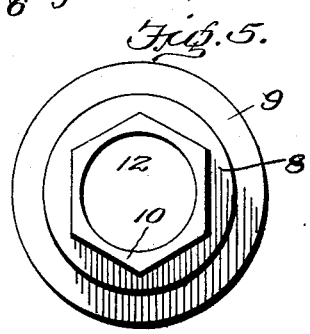
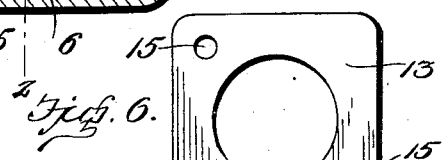
Witnesses
Inventors
H. Dubrow
J. Yurkovich
By Attorneys

UNITED STATES PATENT OFFICE.

HARRY DUBROW AND JAKE YURKOVICH, OF ALLEGHENY, PENNSYLVANIA.

NUT-LOCK.

No. 896,901.  Specification of Letters Patent.  Patented Aug. 25, 1908.

Application filed February 13, 1908. Serial No. 415,739.

*To all whom it may concern:*

Be it known that we, HARRY DUBROW and JAKE YURKOVICH, citizens of the United States, residing at Allegheny, in the county of Allegheny and State of Pennsylvania, have invented certain new and useful Improvements in Nut-Locks; and we do declare the following to be a full, clear, and exact description of the invention, such as will enable others skilled in the art to which it appertains to make and use the same.

This invention relates to new and useful improvements in nut locks and has for its principal object the production of simple and efficient operating means for positively locking the nut against reverse rotation on the bolt, thus obviating liability of the former working loose or becoming displaced from the latter and the disastrous results incident thereto.

In the accompanying drawings in which like parts are designated by like characters throughout the several views, Figure 1 is a view in side elevation of a nut lock embodying our improvements. Fig. 2 is a longitudinal sectional view taken on line 2—2 of Fig. 3 looking in the direction indicated by the arrow. Fig. 3 is a cross section taken on the plane indicated by the dotted lines 3—3 of Fig. 1, looking in the direction indicated by the arrow. Fig. 4 is a view in side elevation of the pawl disengaging means. Fig. 5 is an end elevation of Fig. 4, and, Fig. 6 is a detail view of a retaining plate employed in carrying out the invention.

In the embodiment illustrated the threaded portion of the bolt body 1 is formed with a series, preferably four, of longitudinally extending grooves 2. The outer face of the nut 3 is formed with a relatively large recessed portion 3' in which is pivotally mounted, preferably at diagonally opposite corners, locking pawls 4, the free ends of the latter being designed to engage with either of the grooves 2 of the bolt body, the arrangement of the pawls being such that the operator is permitted to screw the nut on the bolt but in attempting to unscrew the same therefrom, the free ends of the locking pawls will engage with the grooves of the bolt body and prevent reverse rotation of the nut. Said pawls are normally held in interlocking engagement with the grooves 2 by flat springs 5, the outer ends of which bear upon the inner face of the shoulder or flange 6 formed by recessing the nut and the inner or opposite ends of which extend or fit into correspondingly obliquely disposed slots or sockets 7 formed in and near the pivot ends of the locking pawls.

One of the principal features of the invention resides in the provision of means operable to disengage the pawls from the grooves of the bolt body. As shown, this means is in the form of a member comprising a cylindrical body 8 formed at its inner end with an outwardly extending flange 9 of preferably annular formation, and at its outer or opposite end or face with a headed portion 10 which as shown is of hexagonal form.

In carrying out the invention, the inner face of the flange 9 is formed, preferably at diametrically opposite points, with engaging pins or lugs 11 the purpose of which will be disclosed.

The pawl disengaging member above described is formed throughout its length with a bore 12 to receive the body portion of the bolt and is arranged in position by inserting the flange end thereof within the recessed face of the nut, the engaging pins or lugs 11 being arranged in position to engage the free ends of the locking pawls.

To protect the nut locking means and to retain the pawl disengaging member in position, a keeper plate 13 is arranged over the recessed face of the nut, said plate being formed with a central opening for the reception of the body portion 8 of the pawl disengaging member, and at diagonally opposite points with screw receiving apertures 15 through which are inserted fastening screws 16, said screws screwing in corresponding threaded sockets 17 formed in the recessed portion and at diagonally opposite points of the nut.

To remove the nut from position, it is only necessary that the pawl disengaging member be turned a fraction of a revolution in a left handed direction to effect the disengagement of the free ends of the locking pawls from the grooves of the bolt body, after which operation the nut may be readily unscrewed from position. It will also be perceived that the nut, having once been screwed in position, liability of its becoming displaced is positively insured against because of the groove engaging means carried by the nut.

From the foregoing description taken in connection with the drawings, it is thought that the construction and operation of the invention will be readily understood without requiring a more extended explanation.

We claim as our invention:

1. In combination with a longitudinally grooved bolt body, a nut formed in its outer face with a relatively large recessed portion mounted thereon, spring pressed locking pawls pivotally mounted in the recessed portion of the nut to normally engage with the grooves of the bolt body, a pawl disengaging member rotatably mounted upon the bolt body, said member comprising inwardly extending pins which project into the recessed portion of the nut and are adapted to disengage the pawls from the grooves of the bolt body when turned in one direction, and a keeper plate detachably arranged over the recessed portion of the nut to retain the pawl disengaging member in operative position.

2. In combination with a bolt body formed with a series of longitudinally extending grooves, a nut formed in one face with a relatively large recessed portion mounted thereon, spring pressed locking pawls pivotally mounted in the recessed portion of the nut to normally engage with the grooves of the bolt body, a pawl disengaging member rotatably mounted upon the bolt body, said member comprising a cylindrical body formed at its outer face with an outwardly projecting headed portion and at its inner face with an annular flange adapted to fit in the recessed portion of the nut and to bear upon the pawls and with inwardly extending pins which project into the recessed portion of the nut and are adapted to disengage the pawls from the bolt body when the pawl disengaging member is turned in one direction, and a keeper plate mounted upon the body portion of said member and detachably connected with the recessed face of the nut to retain the former in operative position.

In testimony whereof we have hereunto set our hands in presence of two subscribing witnesses.

HARRY DUBROW.
JAKE YURKOVICH.

Witnesses:
 LEE NYE,
 ANDREW MORROW.